United States Patent
Marvin et al.

(10) Patent No.: US 6,174,616 B1
(45) Date of Patent: *Jan. 16, 2001

(54) FUEL CELL ASSEMBLY UNIT FOR PROMOTING FLUID SERVICE AND DESIGN FLEXIBILITY

(75) Inventors: Russel H. Marvin, Voorheesville; Charles M. Carlstrom, Jr., Clifton Park, both of NY (US)

(73) Assignee: Plug Power Inc., Latham, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/167,359

(22) Filed: Oct. 7, 1998

(51) Int. Cl.$^7$ .................................................. H01M 02/00
(52) U.S. Cl. ............................... 429/34; 429/38; 429/39; 429/35
(58) Field of Search ................................. 429/34, 38, 39, 429/35, 72, 12; 29/623.1, 623.2; 264/293

(56) References Cited

U.S. PATENT DOCUMENTS

| | | | |
|---|---|---|---|
| 4,124,478 | 11/1978 | Tsien et al. | 204/255 |
| 4,988,583 | * 1/1991 | Watkins et al. | 429/30 |
| 5,176,966 | * 1/1993 | Epp et al. | 429/26 |
| 5,300,370 | * 4/1994 | Washington et al. | 429/34 |
| 5,527,363 | * 6/1996 | Wilkinson et al. | 29/623.1 |
| 5,750,281 | 5/1998 | Washington et al. | 429/39 |
| 5,912,088 | * 6/1999 | Ernst | 429/35 |

FOREIGN PATENT DOCUMENTS

| | | | |
|---|---|---|---|
| WO 93/13566 | 7/1993 | (WO) | H01M/8/02 |
| WO 94/00620 | 1/1994 | (WO) | C25B/11/03 |

* cited by examiner

Primary Examiner—Stephen Kalafut
Assistant Examiner—Ray Alejandro
(74) Attorney, Agent, or Firm—Heslin & Rothenberg, P.C.

(57) ABSTRACT

In one aspect, a first (flow field) plate of a fuel cell assembly includes a first flow channel(s) thereon. Fluid is conducted to the flow channel through an opening extending through the first plate. An adjacent second plate cooperates in providing surface(s) for a flow path between a manifold and the opening. Additional surface(s) may cooperate in providing the flow path and/or structural support therefor. A formation on the first plate may impede fluid communication from the manifold plate on a plate face including the first flow channel. The formation may provide structural support in a (e.g., PEM-type) fuel cell assembly, and/or a clamping and/or gasketing function for a membrane electrode assembly. A second flow path may similarly be provided for humidification of the (e.g., reactant) fluid. The second flow path may include flow regulator(s) and/or metering orifice (s). The second plate may include a second flow channel thereon. Flow path(s) for the second plate may be configured to provide the aforementioned surface(s) for the flow path(s) for the first plate without interference among fluid service for each plate. A multiplication of manifolds for a fluid may allow a manifold to omit service for a plate, where a different manifold may service the omitted plate.

19 Claims, 10 Drawing Sheets

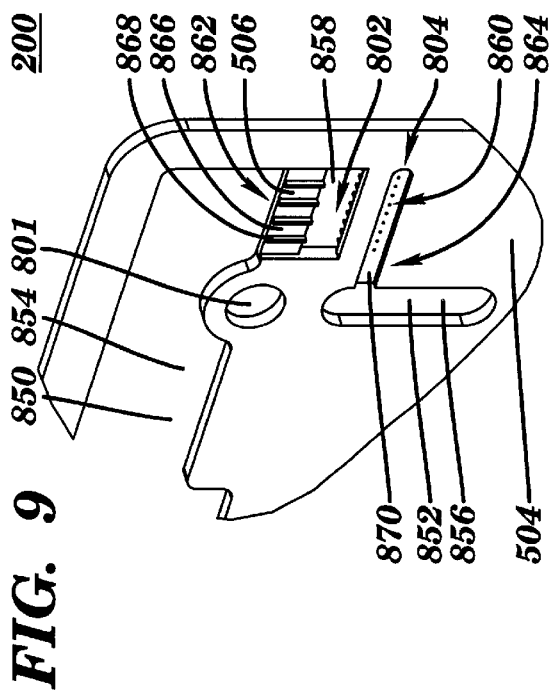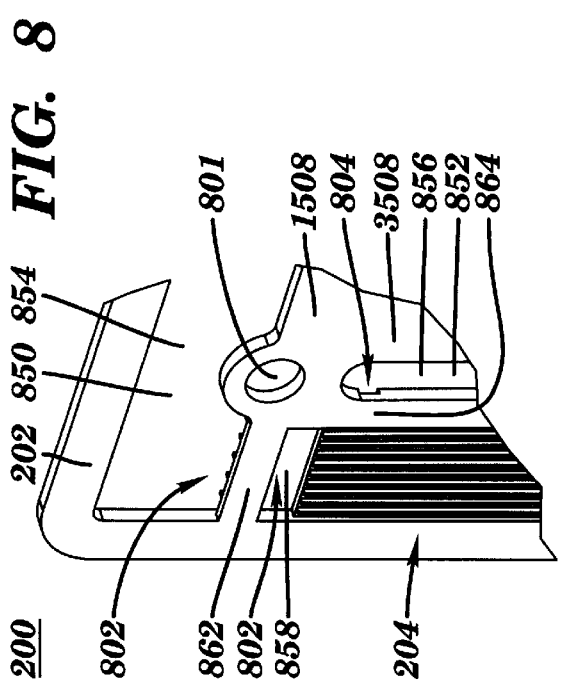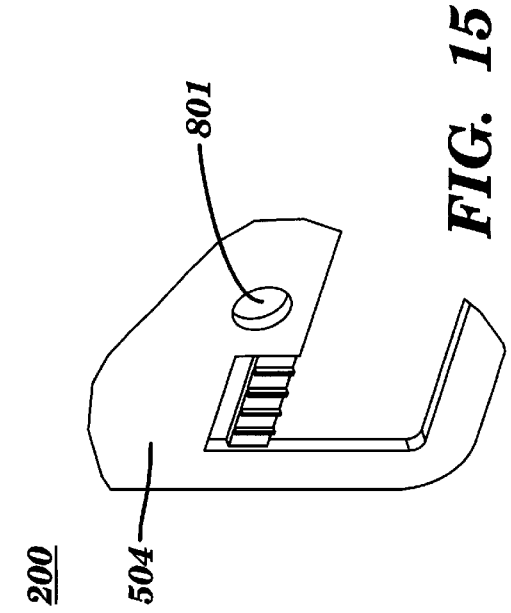

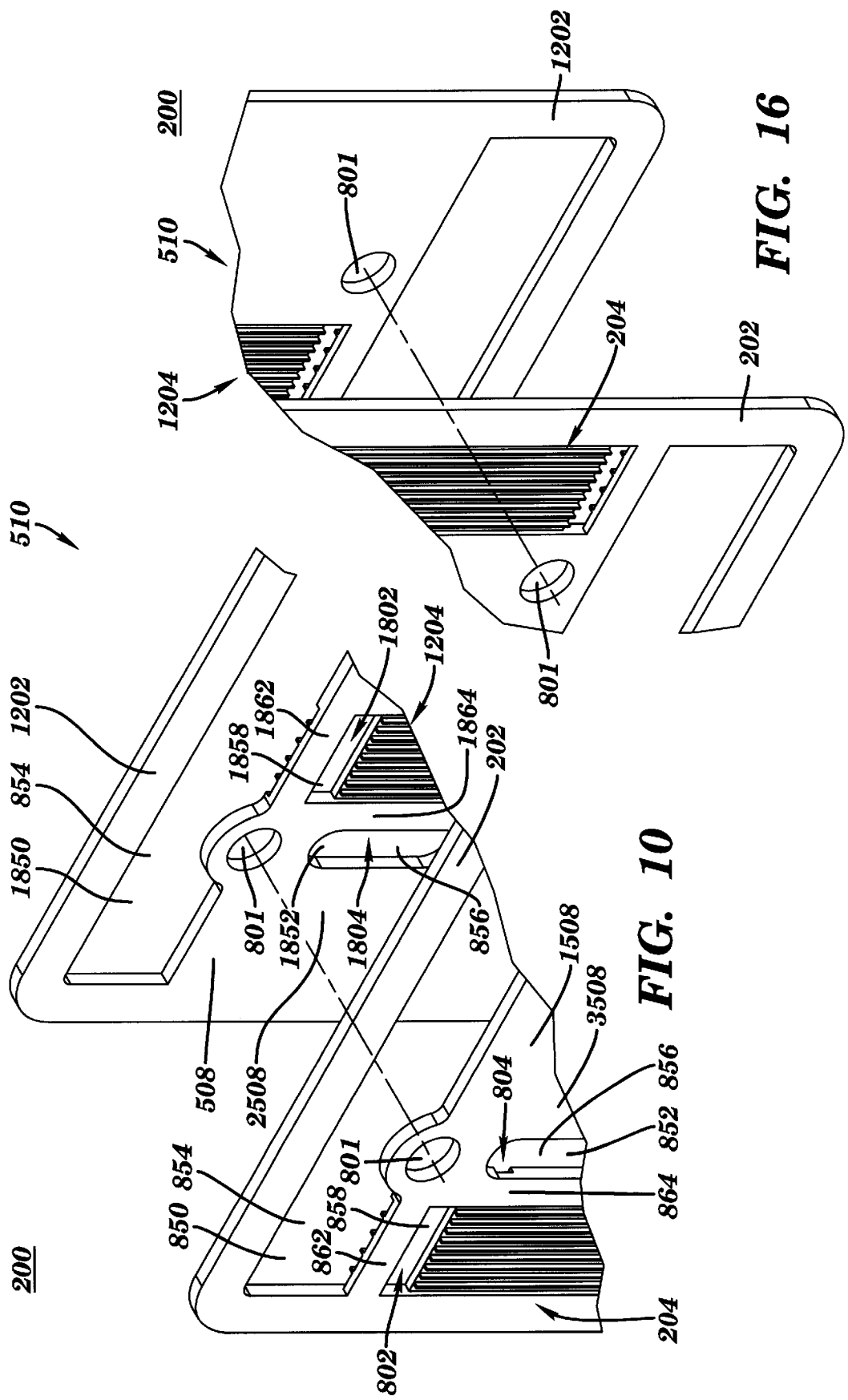

US 6,174,616 B1

FUEL CELL ASSEMBLY UNIT FOR PROMOTING FLUID SERVICE AND DESIGN FLEXIBILITY

TECHNICAL FIELD

This invention relates, generally, to fuel cell assemblies and, more particularly, to fluid service as well as fluid flow plate configuration and positioning for fuel cell assemblies.

BACKGROUND ART

Fuel cells electrochemically convert fuels and oxidants to electricity, and fuel cells can be categorized according to the type of electrolyte (e.g., solid oxide, molten carbonate, alkaline, phosphoric acid, or solid polymer) used to accommodate ion transfer during operation. Moreover, fuel cell assemblies can be employed in many environments, for multiple applications.

A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). Some artisans consider the acronym "PEM" to represent "polymer Electrolyte Membrane." The direction, from anode to cathode, of flow of protons serves as a basis for labeling an "anode" side and a "cathode" side of every layer in the fuel cell, and in the fuel cell assembly or stack.

Usually, an individual PEM-type fuel cell has multiple, generally transversely extending layers assembled in a longitudinal direction. In the typical fuel cell assembly or stack, all layers which extend to the periphery of the fuel cells have holes therethrough for alignment and formation of fluid manifolds that generally service fluids for the stack. As is known in the art, some of the fluid manifolds distribute fuel (e.g., hydrogen) and oxidant (e.g., air/oxygen) to, and remove unused fuel and oxidant as well as product water from, fluid flow plates which serve as flow field plates for each fuel cell. Also, other fluid manifolds circulate coolant (e.g., water) for cooling.

As is known in the art, the PEM can work more effectively if it is wet. Conversely, once any area of the PEM dries out, the fuel cell does not generate any product water in that area because the electrochemical reaction there stops. Undesirably, this drying out can progressively march across the PEM until the fuel cell fails completely. So, the fuel and oxidant fed to each fuel cell are usually humidified. Furthermore, a cooling mechanism is commonly employed for removal of heat generated during operation of the fuel cells.

Flow field plates are commonly produced by any of a variety of processes. One plate construction technique, which may be referred to as "monolithic" style, compresses carbon powder into a coherent mass. Next, the coherent mass is subjected to high temperature processes which bind the carbon particles together, and convert a portion of the mass into graphite for improved electrical conductivity. Then, the mass is cut into slices, which are formed into the flow field plates. Usually, each flow field plate is subjected to a sealing process (e.g., resin impregnation) in order to decrease gas permeation therethrough and reduce the risk of uncontrolled reactions. Typically, flow field channels are engraved or milled into a face of the rigid, resinimpregnated graphite plate. In order to effectively distribute reactant fluid and/or humidification fluid for the PEM, it is desirable that the flow channels remain as open and unclogged as possible.

An exemplary configuration for fuel cell membrane hydration and fluid metering is disclosed in U.S. application Ser. No. 08/899,262 by Jones and Walsh (entitled "Fuel Cell Membrane Hydration and Fluid Metering," filed Jul. 23, 1997, and assigned to Plug Power, L.L.C.), which is hereby incorporated herein by reference in its entirety. In one aspect, a bridge or cover plate can extend along the face of a fluid flow plate and across the inlets thereof, defining one opening or injection port for each inlet in addition to an input orifice to a fluid manifold. The inlets can receive respective portions of a given stream of reactant fluid for the fuel cell. Each injection port can inject a portion of liquid water directly into its respective flow channel in order to mix its respective portion of liquid water with the corresponding portion of the stream. This serves to hydrate at least corresponding parts of a given membrane of the corresponding fuel cell. The hydration system may be augmented by a metering system, including flow regulators. Each flow regulator can meter an injecting of liquid portions at the plate inlets into a given fluid stream. The bridge or cover plate may be interposed between a gasket and the fluid flow plate, at the inlets thereof.

However, it remains desirable to provide refinements to such membrane hydration and fluid metering as well as further enhancements for fluid service, including enhanced flow plate configuration and fluid manifolding. For instance, it may be desired to eliminate need for a bridge or cover plate, while still offering advantages thereof. For example, it is advantageous to protect inlets for flow channels on a fluid flow plate from intrusion by an adjacent material, such as a gasket. Furthermore, it is desirable to maintain a clamping pressure on a membrane electrode assembly, such as between gaskets adjacent each fluid flow face of a fuel cell. Namely, one would wish to avoid reactant fluid (e.g., gas) on one side of the fuel cell from leaking around an edge of the membrane electrode assembly into the opposite side of the fuel cell. In particular, an insufficient clamping of the membrane electrode assembly may allow flapping thereof in the presence of pressurized reactant fluid flow, which may cause leakage of the reactant fluid at the plate inlets to an opposite side of the fuel cell, with deleterious consequences (e.g., explosion).

Thus, a need exists for an improved mechanism for maintaining open and unclogged, flow channels of a fluid flow plate in a fuel cell assembly. A further need exists for such a mechanism to promote stability and support for the fuel cell assembly. An additional need exists for fluid flow plates which are shaped to optimize fluid service. A still further need exists for reducing the number of parts for a fuel cell stack, including easing the assembly thereof. Yet another need exists for coordination and cooperation among fluid flow plates in increasing design flexibility, and in providing features for enhanced fluid service and fuel cell assembly operation.

SUMMARY OF THE INVENTION

Pursuant to the present invention, shortcomings of the existing art are overcome and additional advantages are provided through the provision of a fuel cell assembly unit.

In one aspect of the invention, a fuel cell assembly unit includes a first plate and a second plate. The first plate includes a first face and a second face. The first face comprises a flow field face which includes a flow channel thereon. The first plate includes an aperture forming a manifold portion of a manifold for conducting a fluid for a fuel cell assembly. The flow field face includes a formation thereon serving to impede fluid communication on the flow field face between the flow channel and the aperture. The first plate includes an opening extending between the flow channel and the second face. The second plate includes a third face. The third face includes a surface portion forming a passage portion of a flow path between the manifold and the opening.

The formation can serve to provide a seal with a membrane electrode assembly portion. The formation can include a gasketing material portion and/or be adapted to serve as a gasketing material portion. The formation can serve to provide a seal with a gasketing material portion. The formation can resemble a step and/or include a peak.

In yet another aspect of the present invention, a fuel cell assembly unit includes a first plate and a second plate. The first plate includes a first flow field face which includes a first flow channel thereon. The first plate includes a first aperture forming a first manifold portion of a first manifold for conducting a type of reactant fluid for a fuel cell assembly. A first longitudinal axis of the fuel cell assembly passes through a first port for the first plate. The first port is in fluid communication with the first flow channel and the first manifold. The second plate includes a second flow field face which includes a second flow channel thereon. The second plate includes a second aperture and a third aperture. The second aperture forms a second manifold portion of the first manifold. The third aperture forms a third manifold portion of a second manifold for conducting the type of reactant fluid. A second longitudinal axis of the fuel cell assembly passes through a second port for the second plate. The second port is in fluid communication with the second flow channel and the second manifold. The second plate is formed without a port having the first longitudinal axis pass therethrough and in fluid communication with the second flow channel and the first manifold and/or the second manifold.

The first manifold and the second manifold can comprise a same manifold. The second aperture and the third aperture can comprise a same aperture. The first aperture can form a fourth manifold portion of the second manifold.

The invention further contemplates a method suitable for fuel cell assembly flow field fluid service. A first plate is selected to have a first face and second face. The first face comprises a flow field face which includes a flow field channel thereon. The second face comprises an exterior face. The first plate includes an opening extending between the flow field channel and the exterior face. A second plate is selected to have a third face. The third face includes a surface portion thereon. A fluid portion is conducted along a flow path between a manifold and the flow field channel. The flow path includes the surface portion and the opening.

Thus, the present invention advantageously provides enhanced fluid service for a fuel cell assembly. Further, the invention provides improved configurations for formation of fluid flow plates. Also, coordination and cooperation among fluid flow plates provide geometric features. In addition, there is provided improved sealing of a membrane electrode assembly portion. Metering of humidification fluid is also enabled. Furthermore, a decreased number of components and an easier assembly for a fuel cell stack are included in the present invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 8 is a cutaway, partial, perspective view of one side of a fluid flow plate, illustrating inlet ports between manifolds and flow channels;

FIG. 9 is a cutaway, partial, perspective view of an opposite side of the fluid flow plate of FIG. 8;

FIG. 10 is a cutaway, partial, perspective representation of the fluid flow plate of FIG. 8 and a second fluid flow plate having cooperating surfaces and configurations for providing fluid service, illustrating inlet ports between manifolds and flow channels;

FIG. 14 is a cutaway, partial, perspective view of one side of the fluid flow plate of FIG. 8, illustrating an outlet port between a manifold and flow channels;

FIG. 15 is a cutaway, partial, perspective view of an opposite side of the fluid flow plate of FIG. 14; and FIG. 16 is a cutaway, partial, perspective representation of the fluid flow plates of FIG. 10, illustrating outlet ports between a manifold and flow channels.

BEST MODE FOR CARRYING OUT THE INVENTION

In accordance with the principles of the present invention, a fuel cell assembly is provided in which surfaces of multiple fluid flow plates (e.g., flow field plates) are employed in providing fluid service as well as enhancing support in the fuel cell assembly, in addition to increasing design flexibility therefor and easing formation thereof.

Figure 1:
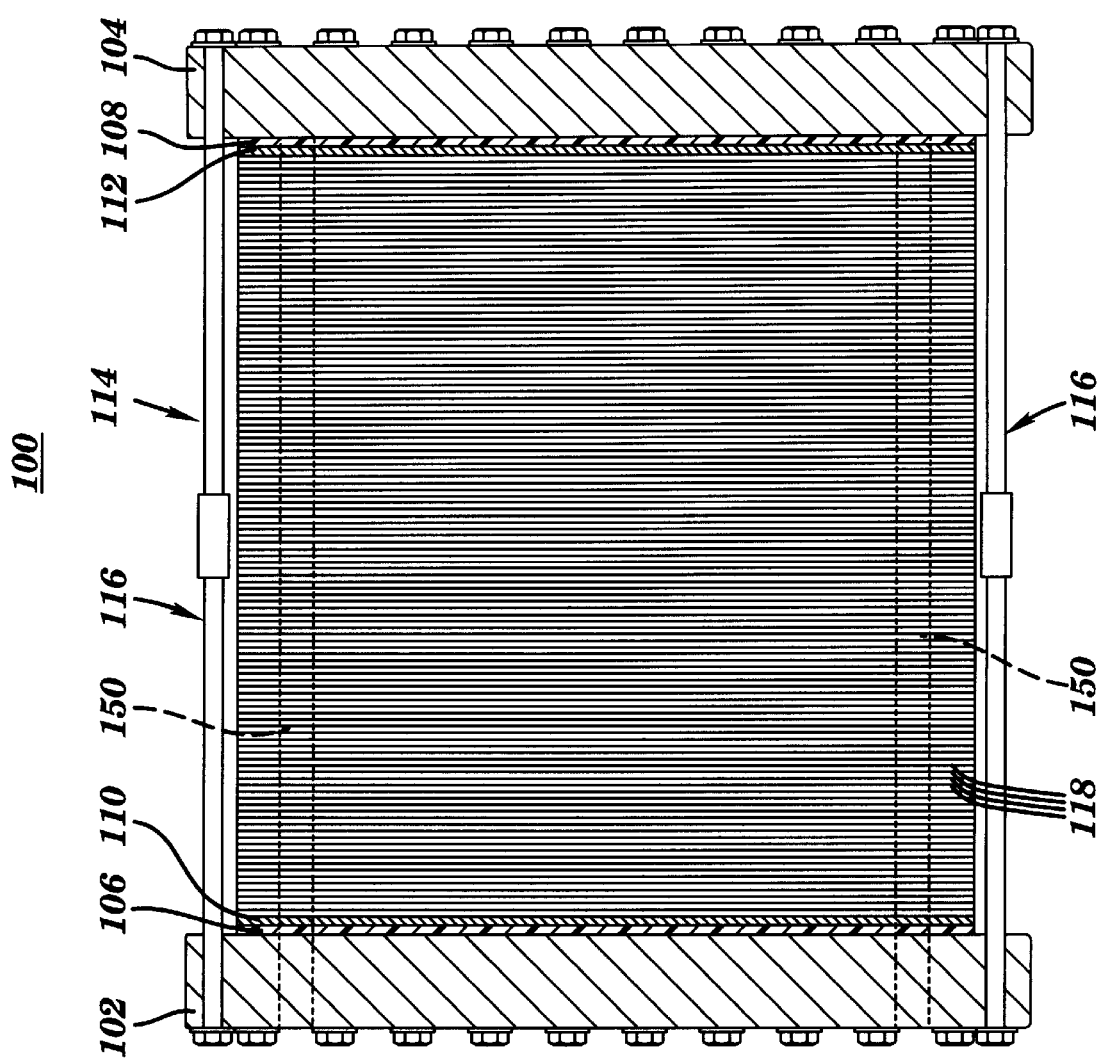
FIG. 1 is a sectional, elevation, side view of one example of a fuel cell assembly incorporating and using the fluid service and design flexibility capabilities of the present invention.

An example of a fuel cell assembly incorporating and using the novel features of the present invention is depicted in FIG. 1 and described in detail herein.

In this exemplary embodiment, a fuel cell assembly 100 includes end plates 102 and 104, insulation layers 106 and 108, and current collector/conductor plates 110 and 112, with a working section 114 therebetween. The working section includes one or more active sections and can include a selected number of cooling sections, as will be understood by those skilled in the art. In one aspect, the one or more active sections can further serve to perform cooling for the fuel cell assembly. A number of structural members 116, such as tie-bolt(s), can be employed to join the end plates.

Working section 114 includes a number of layers 118. The layers generally form fluid manifolds 150 for supplying fluids to, removing fluids from, and otherwise communicating and/or servicing fluids as desired within the working section, as will be appreciated by those skilled in the art. The layers of fuel cell assembly 100 might have applied thereto compressive pressure and/or stress which is approximately equivalent to, preferably, fifty to one thousand pounds per square inch, and, most preferably, two hundred to four hundred pounds per square inch.

Figure 3:
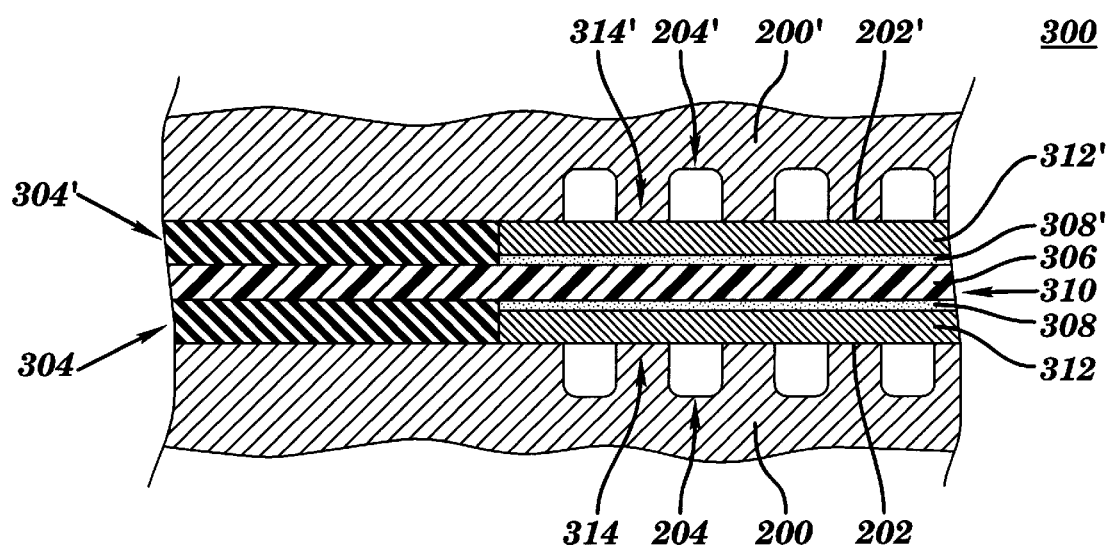
FIG. 3 is a cutaway, sectional, partial, side representation of fluid flow plates serving as flow field plates in a fuel cell of the fuel cell assembly of FIG. 1.

Preferably, a plurality of layers 118 form one or more (e.g., one hundred and eight) PEM-type fuel cells 300 (FIG. 3). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
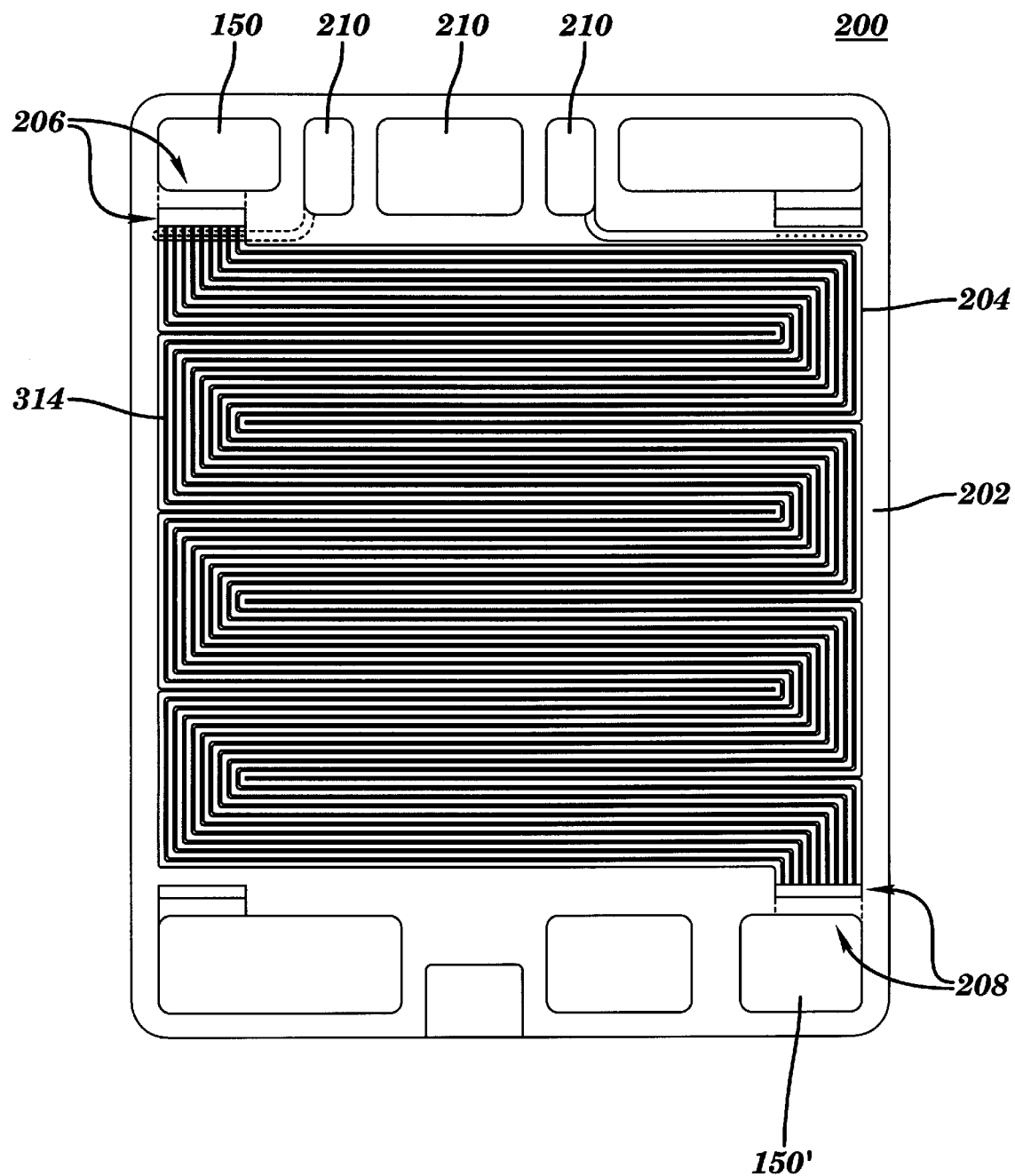
FIG. 2 is a plan view of an outer face of one example of a fluid flow plate of the fuel cell assembly of FIG. 1.

One example of a layer 118 of working section 114 is depicted in FIG. 2 as fluid flow plate 200. The plate has a fluid flow face 202 with one or more, for instance, substantially parallel and/or generally serpentine, flow channel(s) 204 thereon. The flow channels receive and transmit one or more fluids through ports 206 and 208 which are in fluid communication with corresponding fluid manifolds 150 and 150'.

In one embodiment, flow channel(s) 204, through formation of solid sidewalls in fluid flow face 202, may have any preselected configuration(s), such as for providing and/or ensuring maximal, even, continuous, appropriate, desired and/or uniform fluid service and/or coverage for active area(s) of membrane electrode assembly 310 (FIG. 3). In one example, land(s) 314, 314' (FIG. 3) may separate adjacent flow channel sections.

As will be understood by those skilled in the art, a given fluid flow plate 200 may be a bipolar, monopolar, combined monopolar (e.g., anode cooler or cathode cooler), or cooling plate. In one example, the fluid flow plate serves as a flow field plate and flow channels 204 conduct fluid which includes reactant fluid for fuel cell assembly 100. The reactant fluid serves as fuel or oxidant for a given fuel cell 300 (FIG. 3). For instance, the flow channels can carry reactant gas (e.g., a fuel such as hydrogen or an oxidant such as air/oxygen) as well as vapor and/or liquid (e.g., humidification and/or product water), as will be understood by those skilled in the art.

Referring to FIG. 2, fluid flow plate 200 has a number of (e.g., peripheral) holes 210 therethrough. A number of the holes 210 may cooperate in formation of fluid manifolds, such as fluid manifolds 150, of fuel cell assembly 100. Preferably, the perimeters of layers 118 are formed with minimal amounts of material disposed generally transversely beyond the active extent of working section 114 as well as the fluid manifolds of the fuel cell assembly, as represented in FIG. 2. In one example, the fluid flow plate may be formed with a material such as non-magnetic, austenitic stainless steel. In another example, a material such as titanium may be employed.

In a further example, fluid flow plate 200 may be formed in accordance with the principles of U.S. application Ser. No. 09/054,670 by Carlstrom (entitled "Easily-Formable Fuel Cell Assembly Fluid Flow Plate Having Conductivity and Increased Non-Conductive Material," filed Apr. 3, 1998, and assigned to Plug Power, L.L.C.), which is hereby incorporated herein by reference in its entirety. In one aspect, the fluid flow plate may include conductive, non-conductive, injection-moldable and compliant portions. In another aspect, the fluid flow plate may include hole(s) 801 (FIGS. 8–10 and 14–20) for receiving structural members 116 (FIG. 1) therethrough.

In one embodiment, gasketing material or gaskets 304, 304' (FIG. 3) may be employed to seal peripheral holes 210 (FIG. 2), and may cooperate with other portions of layers 118 in formation of the fluid manifolds. Referring to FIG. 3, a given gasket 304, 304' might take the form of, for instance, a frame gasket made from a polytetrafluoroethylene ("PTFE") material manufactured by E. I. DuPont de Nemours Company and sold under the trademark TEFLON®. In another embodiment, O-ring gasket(s) might be employed.

For purposes of illustration, FIG. 3 depicts fuel cell 300 with fluid flow plates 200 and 200' serving as flow field plates. In particular, flow field plate 200 might serve as an anode side of the fuel cell, and flow field plate 200' might serve as a cathode side of the fuel cell. That is, face 202 might comprise an anode face, and face 202' might comprise a cathode face. For instance, flow channels 204 might carry hydrogen, as fuel, and humidification water (vapor and/or liquid). Further, flow channels 204' might carry air/oxygen, as oxidant, as well as humidification water (vapor and/or liquid) and/or product water (vapor and/or liquid), as will be understood by those skilled in the art.

Fuel cell 300 includes membrane or solid electrolyte 306. Preferably, the solid electrolyte 306 comprises a solid polymer electrolyte made using a polymer such as a material manufactured by E. I. DuPont de Nemours Company and sold under the trademark NAFION®. Further, an active electrolyte such as sulfonic acid groups might be included in this polymer. In another example, the solid polymer electrolyte might be formed with a product manufactured by W. L. Gore & Associates (Elkton, Md.) and sold under the trademark GORE-SELECT®. Moreover, catalysts 308 and 308' (e.g., platinum), which facilitate chemical reactions, are applied to the anode and cathode sides, respectively, of the solid polymer electrolyte. This unit can be referred to as a "membrane electrode assembly" (hereinafter "MEA") 310. The MEA might be formed with a product manufactured by W. L. Gore & Associates and sold under the trade designation PRIMEA 5510-HS.

MEA 310 is sandwiched between anode and cathode gas diffusion layers (hereinafter "GDLs") 312 and 312', respectively, which may be formed with a resilient and conductive material such as carbon fabric, carbon fiber paper, carbon cloth or carbon paper.

In one embodiment of a gas diffusion layer (hereinafter "GDL") 312, 312', porous carbon cloth or paper is infused with a slurry of carbon black and sintered with TEFLON® material. The anode and cathode GDLs serve as electrochemical conductors between corresponding catalyzed sites of solid polymer electrolyte 306 and the fuel (e.g., hydrogen) and oxidant (e.g., air/oxygen) which each flow in anode and cathode flow channels 204 and 204', respectively. Further, the GDLs also present to the surfaces of MEA 310 a combination of microscopic porosity and macroscopic porosity. Microscopic porosity allows reactant gas molecules to pass generally longitudinally from the flow channels to a surface of the MEA. Macroscopic porosity allows product water formed at the cathode surface of the MEA to be removed therefrom by flowing generally longitudinally into the cathode flow channels, to prevent flooding of the catalyst particles.

In one example, deionized water might be added to a given reactant gas stream conducted by flow channel(s) 204, 204'. The water would desirably serve to humidify membrane 306. In an exemplary embodiment, humidification of reactant fluid may occur in accordance with the principles of the above-incorporated U.S. application Ser. No. 08/899, 262. In an alternative embodiment, a reactant fluid (e.g., gas) stream may be humidified in any of a variety of ways, as will be understood by those skilled in the art.

Referring to FIG. 3, it is desirable to provide maximal conductivity between catalyst 308 and electrical contact position(s) on face 202, and between catalyst 308' and electrical contact position(s) on face 202', as will be appreciated by those skilled in the art. That is, it is advantageous to maximize conductivity between the anode face of MEA 310 and the electrical contact position(s) on the anode face 202, and between the cathode face of the MEA and the electrical contact position(s) on the cathode face 202'.

For example, still referring to FIG. 3, portions of lands 314 and 314' may serve as electrical contact positions on corresponding anode and cathode faces 202 and 202'. The land(s) 314, 314' may be formed, for instance, with a material such as non-magnetic, austenitic stainless steel. In another example, a material such as titanium may be employed. Additional description of possible electrical contact positions is provided in the above-incorporated U.S. application Ser. No. 09/054,670.

Referring further to FIG. 3, GDL 312 is located between lands 314 and (e.g., catalyst 308) the anode side of MEA 310, and GDL 312' is located between the lands 314' and (e.g., catalyst 308') the cathode side of the MEA.

Figure 4:
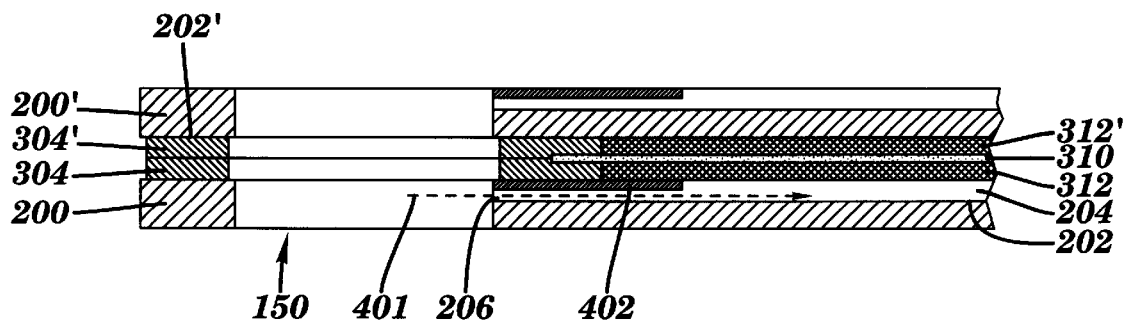
FIG. 4 is a cutaway, sectional, partial, side representation of a flow path between a manifold and a flow channel on a fluid flow face, illustrating the flow path as employing a bridge plate between the fluid flow face and a gasket.

Now referring to FIG. 4, bridge or cover plate 402 may be employed between gasket 304 and flow channel(s) 204. An exemplary configuration for such a bridge or cover plate is disclosed in the above-incorporated U.S. application Ser. No. 08/899,262. In one aspect, the bridge or cover plate may serve to maintain open and unclogged certain port(s) 206 between manifold 150 and the flow channels, such as for flow path 401. For instance, the bridge or cover plate may serve to prevent intrusion of the gasket into the ports (e.g., under compression of fuel cell assembly 100).

In another aspect, again referring to FIG. 4, bridge or cover plate 402 may serve to cooperate with opposite gasket 304' and opposite plate 200' in maintaining a clamping or sealing pressure on MEA 310, thereby advantageously preventing unwanted leakage or seeping of, for instance, reactant fluid in a fuel cell. For example, one typically would wish to avoid leakage of anode reactant gas from fluid manifold 150, between the gasket 304' and the MEA 310, and directly to the cathode side of the MEA, as well as any leakage or seeping of cathode reactant gas, from a fluid manifold, between the gasket 304 and the MEA 310, and directly to the anode side of the MEA. Such leakage or seeping may have deleterious consequences for operation of fuel cell assembly 100, such as an explosion therein or thereof, as will be appreciated by those skilled in the art.

However, inclusion of bridge or cover plate 402 requires manufacturing of the same, as well as careful positioning thereof during assembly of fuel cell stack 100. In one aspect, it may be desirable to eliminate expense and/or effort associated with and/or attributable to the separate part or piece of the bridge or cover plate, through a configuration which nevertheless provides the advantageous functions of the bridge or cover plate.

Figure 5:
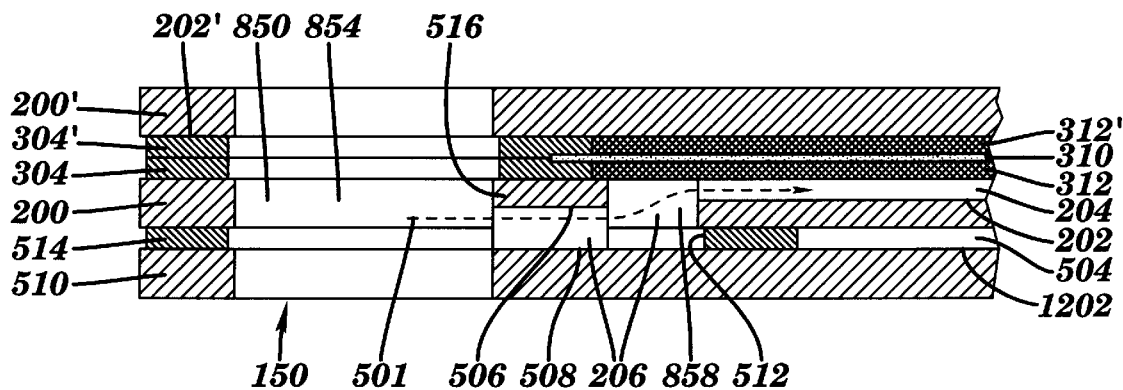
FIG. 5 is a cutaway, sectional, partial, side representation of a flow path between a manifold and a flow channel on a fluid flow face of a fluid flow plate, illustrating the flow path passing along an adjacent fluid flow plate and through an opening in communication with the flow channel.

In one example of such a configuration, referring to FIG. 5, port 206 may provide fluid communication between flow channel(s) 204 on fluid flow face 202 and fluid manifold 150 by employing opening 858 between the fluid flow face 202 and backside face 504. Moreover, the port may comprise flow path 501 between the manifold and the flow channel employing, for instance, first surface 506 on the backside face, second surface 508 on additional fluid flow plate 510, third surface 512 on additional gasket 514, and/or other surface(s).

Still referring to FIG. 5, fluid flow face 202 may include formation 516 serving, in one aspect, to impede and/or prevent fluid communication on the fluid flow face 202 directly from manifold 150, past gasket 304, and to flow channel(s) 204. The formation may further serve to abut the gasket 304 and maintain sealing or clamping pressure for MEA 310 against and/or with opposite gasket 304' in abutment with opposite face 202' of opposite fluid flow plate 200', such as for preventing undesired leakage. In one aspect, the formation may resemble a step. For example, the formation may serve to eliminate need for a separate bridge or cover plate or piece, and advantageously reduce the number of parts in fuel cell stack 100, thereby easing manufacturing and assembling thereof.

For explanatory purposes, port 206 may be considered to be an inlet port, where those skilled in the art will appreciate how description herein of such an inlet port may apply and/or be extended and/or modified to apply to certain aspects of an outlet port (e.g., one may for illustrative purposes consider port 208 of FIG. 2 to be such an outlet port).

Figure 6:
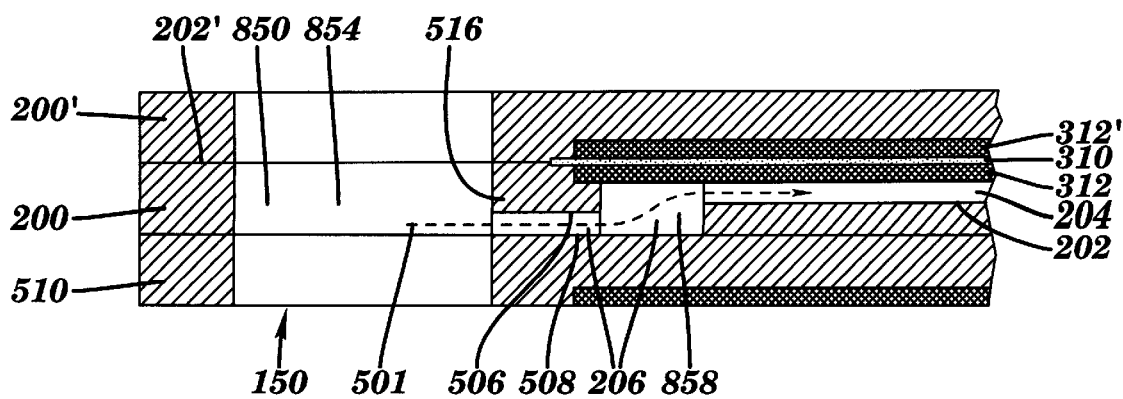
FIG. 6 is a view similar to FIG. 5, further illustrating a peripheral portion of the fluid flow plate providing a gasketing function by interfacing with a membrane electrode assembly portion.
Figure 7:
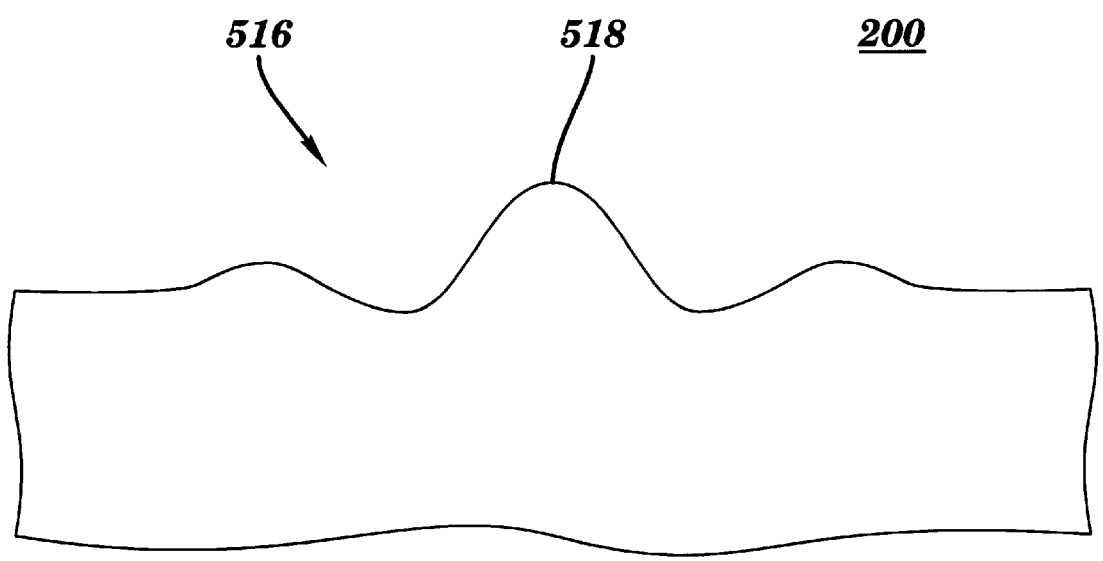
FIG. 7 is an enlarged cutaway, partial, side, sectional representation of an exemplary configuration for the peripheral portion of the fluid flow plate of FIG. 6.

In a further aspect, referring to FIG. 6, formation 516 may provide a gasketing function. For instance, the formation may directly seal with MEA 310. In one example, the formation may comprise feature(s) of fluid flow plate 200 formed in accordance with the principles of the above-incorporated U.S. application No. 09/054,670. For instance, the formation may comprise physical and/or geometric feature(s) of non-conductive, compliant, and/or injection-molded materials). In one example, referring to FIG. 7, the formation may include peak(s) 518, such as for enhancing sealing with the MEA.

An exemplary embodiment of port(s) 206 as including reactant inlet port 802 and humidification inlet port 804 is now described with reference to FIGS. 8–9.

Referring to FIGS. 8–9, fluid flow plate 200 may include aperture(s) 850 and/or 852 extending therethrough. In one example, the aperture 850 may form a portion of reactant fluid manifold 854. The reactant fluid manifold may carry reactant fluid for a number of fuel cells 300 of fuel cell assembly 100. For instance, the aperture 852 may form a portion of humidification fluid manifold 856. The humidification fluid manifold may carry humidification fluid to be added to the reactant fluid provided through the reactant fluid manifold, such as for humidification of MEA 310. For instance, the reactant fluid may comprise a fuel such as hydrogen or an oxidant such as air/oxygen. Further, the humidification fluid may comprise a liquid such as deionized water.

Still referring to FIGS. 8–9, in an exemplary configuration for port(s) 802, fluid flow plate 200 may include opening(s) 858 and/or opening(s) 860. The opening 858 may participate in communication of reactant fluid between reactant fluid manifold 854 and flow channel(s) 204. The openings 860 may participate in communication of humidification fluid between humidification fluid manifold 856 and the flow channels 204.

Further referring to FIGS. 8–9, fluid flow plate 200 may include formation(s) 862 and/or 864. The formation 862 may be located between reactant fluid manifold 854 and opening 858. Also, the formation 864 may be located between humidification fluid manifold 856 and opening(s) 860.

With respect to exemplary reactant fluid flow, again referring to FIGS. 8–9, formation 862 may resemble a step on fluid flow face 202 serving to impede and/or prevent fluid communication between reactant fluid manifold 854, directly on the fluid flow face 202, and into flow channel(s) 204. As described herein, reactant fluid may be communicated between the reactant fluid manifold and the flow channels by passing on surface(s) between the flow channels and the reactant fluid manifold, including surface(s) not located on the fluid flow face 202. For instance, a flow path between the reactant fluid manifold and the flow channels may pass along surface 506 of face 504. In one example, the formation 862 may include passage(s) 866 for participating in fluid flow between the reactant fluid manifold 854 and opening 858. In one aspect, the formation 862 may include rib(s) 868 between instances of the passages 866.

With respect to exemplary humidification fluid flow, still referring to FIGS. 8–9, formation 864 may resemble a step on fluid flow face 202 serving to impede and/or prevent fluid communication on the fluid flow face directly between humidification fluid manifold 856 and flow channel(s) 204. Further, the formation 864 may on face 504 include passage(s) 870 between the humidification fluid manifold and opening(s) 860. In one example, the openings 860 may resemble flow regulators and/or metering orifices such as are disclosed in the above-incorporated U.S. application Ser. No. 08/899,262. For instance, the openings 860 may serve to atomize humidification liquid to be added to reactant fluid flow streams in the flow channels 204.

In one aspect, referring to FIGS. 8–9, formation(s) 862 and/or 864 may serve to obviate the previous need(s) for bridge or cover plate(s) or piece(s). In particular, the step(s), optionally including peak(s) 518, for fluid flow face 202, may serve to provide sealing and/or clamping surface(s) with layer(s) 118 such as portion(s) of gasket(s) 304 and/or MEA(s) 310. Furthermore, flow path(s) on and/or adjacent to face 504, may serve to eliminate need for separate bridge or cover plate(s) or/or piece(s), while providing fluid communication between flow channel(s) 204 and reactant fluid manifold 854 and/or humidification fluid manifold 856.

As will be appreciated by those skilled in the art, port(s) 802 may include a plurality of openings 858 extending through fluid flow plate 200, analogously to the exemplary depiction in FIG. 9 of a plurality of openings 860 illustratively comprising port(s) 804.

For explanatory purposes, FIGS. 8–10 and 14–16 illustrate exemplary cooperating configuration(s) among fluid flow plates 200 and 510.

As can be understood through examination of FIGS. 10 and 16, fluid flow plates 200 and 510, in an exemplary configuration, include similar feature(s), some of which are aligned and others of which are offset, to provide cooperating surface(s), as described herein. A number of features of fluid flow plate 200 have already been described in detail above, and similar features of fluid flow plate 510 are now described.

Referring to FIG. 10, port(s) 206 (FIG. 2) may include reactant inlet port 1802 and humidification inlet port 1804, which may be analogous to ports 802 and 804, respectively. In particular, fluid flow plate 510 may include aperture(s) 1850 and/or 1852 extending therethrough. In one example, the aperture 1850 may form a portion of reactant fluid manifold 854. For instance, the aperture 1852 may form a portion of humidification fluid manifold 856. The fluid flow plate 510 may include opening(s) 1858, and/or opening(s) comparable to opening(s) 860 (FIG. 9). The opening 1858 may participate in communication of reactant fluid between the reactant fluid manifold 854 and flow channel(s) 1204. The above-mentioned openings analogous to the openings 860, may participate in communication of humidification fluid between the humidification fluid manifold 856 and the flow channels 1204.

Again referring to FIG. 10, fluid flow plate 510 may include formation(s) 1862 and/or 1864, which may be similar to formations 862 and 864, respectively. For instance, the formation 1862 may be located between reactant fluid manifold 854 and opening 1858.

Returning to FIG. 10, fluid flow plate 200 may include aperture 850 forming a portion of reactant fluid manifold 854. Fluid flow plate 510 may include aperture 1850 forming another portion of the same reactant fluid manifold 854. In one aspect, the apertures 850 and 1850 may have a first longitudinal axis of fuel cell assembly 100 passing therethrough. For instance, the apertures 850 and 1850 may include portions thereof at locations sharing same approximate transverse offset(s) with respect to a certain longitudinal axis of the fuel cell assembly.

In another aspect, referring again to FIG. 10, port 802 for fluid flow plate 200 may provide fluid communication between reactant fluid manifold 854 and flow channel(s) 204 on fluid flow face 202. In a further aspect, port 1802 may provide fluid communication between the reactant fluid manifold 854 and flow channel(s) 1204 on face 1202 of fluid flow plate 510. In one example, the ports 802 and 1802 have different longitudinal axes of fuel cell assembly 100 passing therethrough. In a still further aspect, opening 858 of the fluid flow plate 200 and surface 508 of fluid flow plate 510 have a same longitudinal axis of the fuel cell assembly passing therethrough. In particular, the surface 508 may participate in providing a flow path between the reactant fluid manifold 854 and the flow channel(s) 204 on the fluid flow face 202, as described herein. In yet another aspect, fluid flow face 202 may include surface 1508. The surface 1508 and opening 1858 of plate 510, in one example, have a same longitudinal axis of the fuel cell assembly passing therethrough. Where multiple instances of fluid flow plates 200 and 510 are positioned one behind the other, various instances) of surface 1508 may participate in providing fluid communication between reactant fluid manifold 854 and flow channel(s) 1204, similarly to the above-described exemplary function provided by surface 508 between the reactant fluid manifold and the flow channels 204, as will be appreciated by those skilled in the art.

Still referring to FIG. 10, it may be observed that fluid flow plate 510 has port 1802 located so a longitudinal axis of fuel cell assembly 100 passing through the port 1802 passes through surface 1508 of fluid flow face 202, but does not pass through port 802 of the fluid flow face 202. Further, the fluid flow plate 200 has the port 802 located so a longitudinal axis of the fuel cell assembly passing therethrough also passes through surface 508 of fluid flow face 1202, but does not pass through the port 1802. That is, the present invention includes selected alignment(s) and unalignment(s). Therefore, the surface 508 may participate in providing fluid communication between reactant fluid manifold 854 and flow channels 204 without interfering with reactant fluid communication between the reactant fluid manifold and flow channels 1204, as described herein. Similarly, interference with humidification fluid service may be avoided.

Referring further to FIG. 10, formation 862 may cooperate with surface 508 in providing a mechanism allowing reactant fluid communication between reactant fluid manifold 854 and flow channels 204, in addition to providing for MEA 310 clamping and/or sealing previously provided through an additional bridge or cover plate or piece. Comparable advantage(s) may be provided through positioning of formation 1862 between the reactant fluid manifold and flow channels 1204, as well as coordination with a particular instance of surface 1508 (e.g., located on an instance of fluid flow plate 200 positioned behind fluid flow plate 510), as will be appreciated by those skilled in the art.

In a still further aspect and as can be understood through examination of FIGS. 8–9 in conjunction with FIG. 10, fluid flow plate 510 may include surface 2508 having a longitudinal axis of fuel cell assembly 100 passing therethrough, which longitudinal axis may also pass through port 804 for fluid communication between humidification fluid manifold 856 and flow channel(s) 204. The surface 2508 may participate in providing flow path(s) between the humidification fluid manifold and the flow channels 204, in cooperation with formation 864, as described herein. Also, fluid flow plate 510 may have port 1804 providing fluid communication between the humidification fluid manifold and flow channel(s) 1204, located so a longitudinal axis of the fuel cell assembly, different from the above-mentioned longitudinal axis passing through port 804 and surface 2508, passes through the port 1804 and surface 3508 of fluid flow face 202. As will be appreciated by those skilled in the art, an instance of surface 3508 located on an instance of fluid flow plate 200 positioned behind fluid flow plate 510, may cooperate with formation 1864 in providing a flow path between humidification fluid manifold 856 and flow channels 1204, while obviating the previous need for a bridge or cover plate or piece, as described herein.

In one aspect, referring to FIGS. 8–10 and 14–16, port 802 may exemplify an inlet port between reactant fluid manifold 854 and flow channel(s) 204, and port 1802 may exemplify an inlet port between the reactant fluid manifold and flow channel(s) 1204. Further, port 804 may serve to illustrate an inlet port between humidification fluid manifold 856 and the flow channels 204, and port 1804 may serve to illustrate an inlet port between the humidification fluid manifold and the flow channels 1204. As will be appreciated by those skilled in the art, at corresponding outlet ports for the flow channels 204 and 1204, in one example, certain ports may be provided as outlet ports. Namely, at discharge of reactant fluid, product fluid, and/or humidification fluid, it may often be the case that a single exit manifold with a single exit port thereto from flow channel(s) 204, 1204 will suffice, as will be understood by those skilled in the art. Still, formations such as formations 862 and 1862 may be employed at such outlet ports in order to further obviate need for bridge or cover plate(s), such as through configuration(s) which place the outlet ports on (e.g. successive) plates along different longitudinal axes of the fuel cell assembly, with surfaces such as surfaces 508 and 1508 being located for contribution in providing flow paths between the exit manifold and the flow channels, as described herein.

Figure 11:
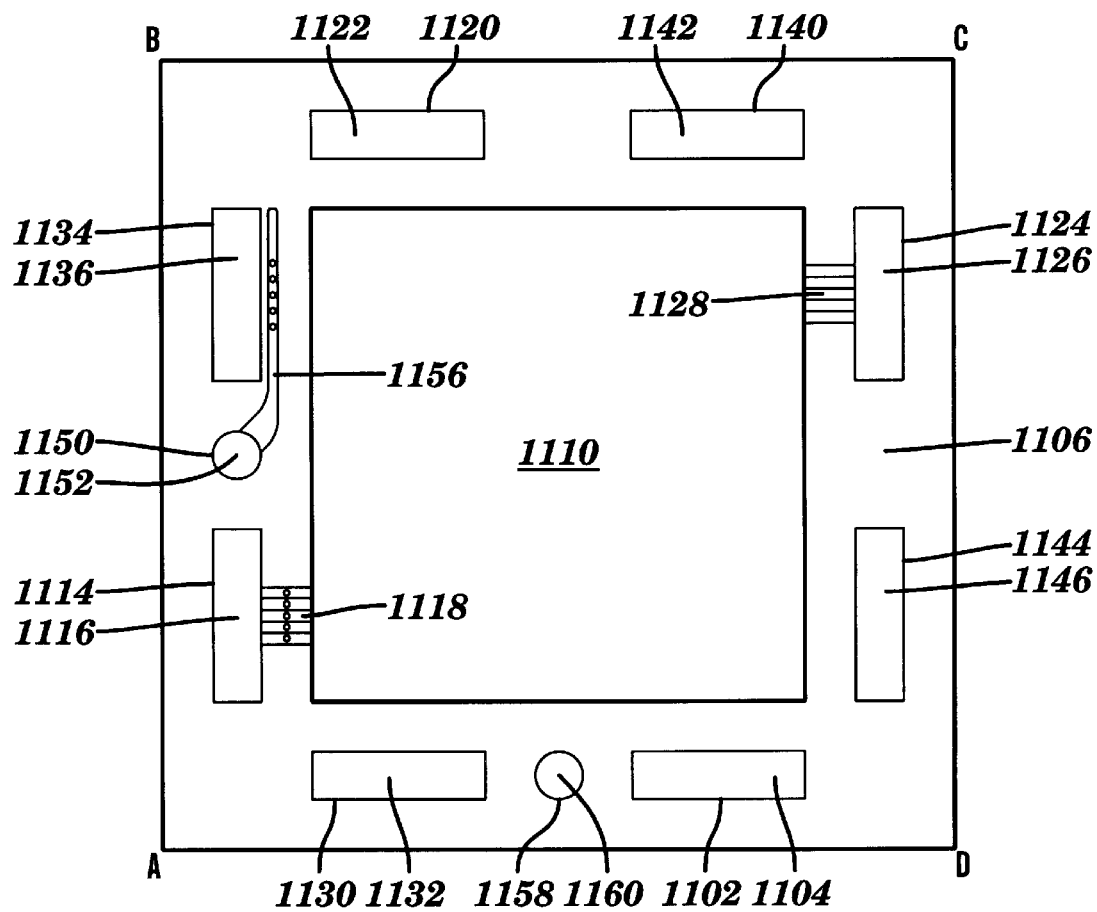
FIG. 11 is a plan view of an outer face of one example of a fluid flow plate having multiplied fluid manifolds extending therethrough.
Figure 12:
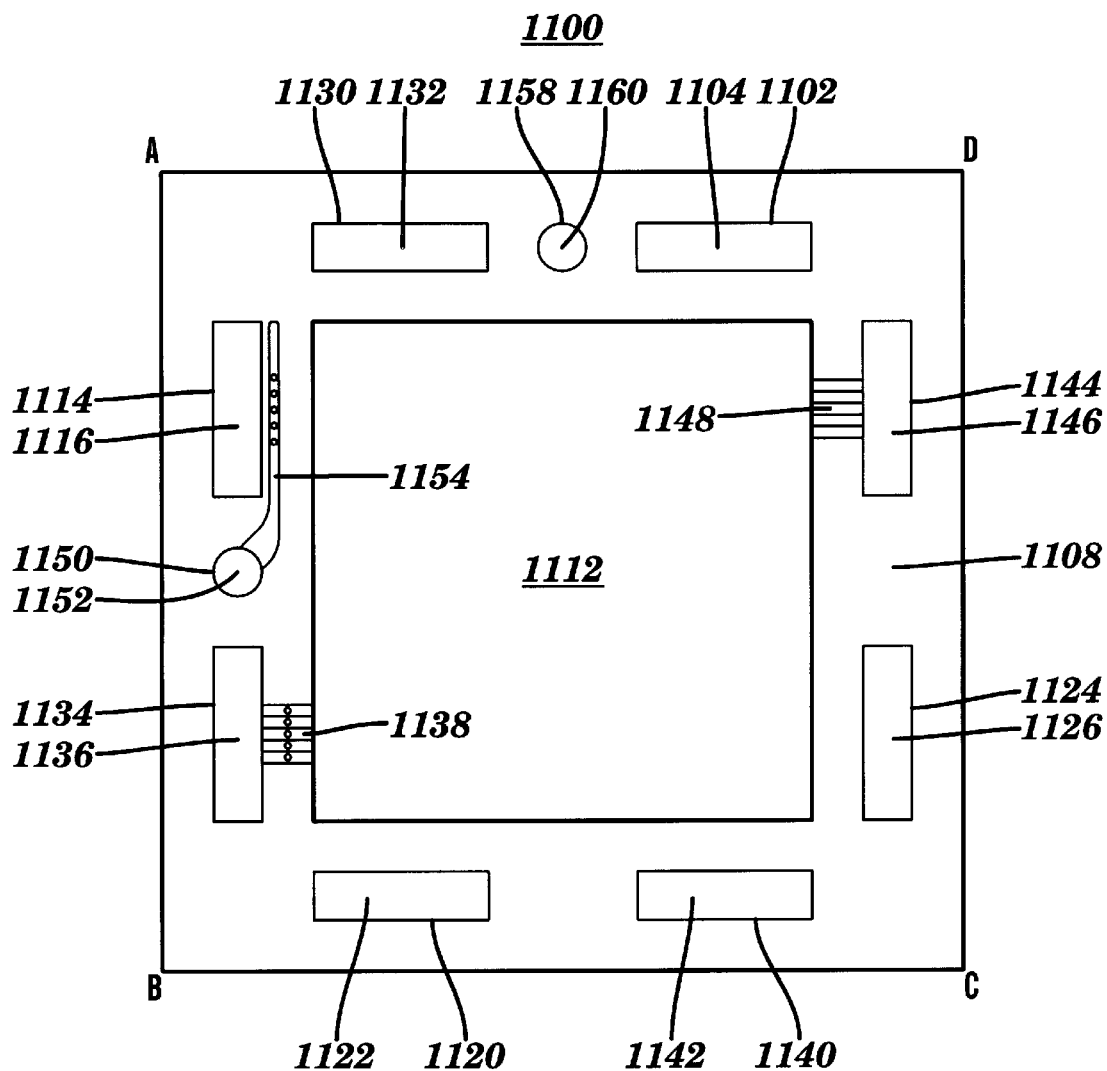
FIG. 12 is a plan view of an opposite outer face of the fluid flow plate of FIG. 11.

Turning now to FIGS. 11–12, fluid flow plate 1100 includes multiple apertures serving to form respective portions of corresponding fluid manifolds for fuel cell assembly 100. It is understood that various feature(s) of fluid flow plate 1100 may allow and/or be modified to allow numerous uses. For illustrative purposes, a specific application of the fluid flow plate 1100 is now presented.

In one example, referring to FIGS. 11–12, fluid flow plate 1100 includes aperture 1102 forming a portion of an entrance fuel manifold 1104 lacking a port for face 1106 or face 1108 between the entrance fuel manifold 1104 and flow channel area 1110 on fluid flow face 1106 or flow channel area 1112 on fluid flow face 1108. The fluid flow plate 1100 includes aperture 1114 forming a portion of entrance fuel manifold 1116 in fluid communication with port(s) 1118, providing fluid communication between the flow channel area 1110 on the fluid flow face 1106 and the entrance fuel manifold 1116. Furthermore, the fluid flow plate 1100 includes aperture 1120 forming a portion of exit fuel manifold 1122 lacking a port between the same and the flow channel area 1110 or the flow channel area 1112. Moreover, the fluid flow plate 1100 includes aperture 1124 forming a portion of exit fuel manifold 1126 in fluid communication with port 1128, providing fluid communication between the flow channel area 1110 and the exit fuel manifold 1126.

Still referring to FIGS. 11–12, fluid flow plate 1100 includes aperture 1130 forming a portion of entrance oxidant manifold 1132 lacking a port providing fluid communication between the same and flow channel area 1110 or flow channel 1112. Aperture 1134 forms a portion of entrance oxidant manifold 1136 in fluid communication with port 1138, providing fluid communication between flow channel area 1112 and the entrance oxidant manifold 1136. Aperture 1140 forms a portion of exit oxidant manifold 1142 lacking a port between the same and the flow channel area 1110 or the flow channel area 1112. Aperture 1144 forms a portion of exit oxidant manifold 1146 in fluid communication with port 1148, providing fluid communication between flow channel area 1112 and the exit oxidant manifold 1146.

Further referring to FIGS. 11–12, aperture 1150 forms a portion of humidification fluid manifold 1152. The humidification fluid manifold 1152 is in fluid communication with port 1154, providing fluid communication between the humidification fluid manifold 1152 and port 1118, in fluid communication with flow channel area 1110. Furthermore, the humidification fluid manifold 1152 is in fluid communication with port 1156, which is in fluid communication with port 1138 providing fluid communication with flow channel area 1112. Aperture 1158 forms a portion of humidification fluid manifold 1160 lacking a port providing fluid communication between the humidification fluid manifold 1158 and the flow channel area 1110 or the flow channel area 1112.

So, in this exemplary implementation illustrated in FIGS. 11–12, fuel and humidification fluid may enter flow channel area 1110 from port 1118, and exit the flow channel area 1110 through port 1128. Furthermore, oxidant and humidification fluid may enter flow channel area 1112 from port 1138, and exit the flow channel area 1112 through the port 1148.

Again referring to FIGS. 11–12, fluid flow plate 1100 is illustrated, for explanatory purposes, with four corners labeled A, B, C, and D. These labels will now be employed in describing an exemplary relative rotation among multiple instances of the fluid flow plate 1100, for advantage(s) such as enhanced design flexibility.

Figure 13:
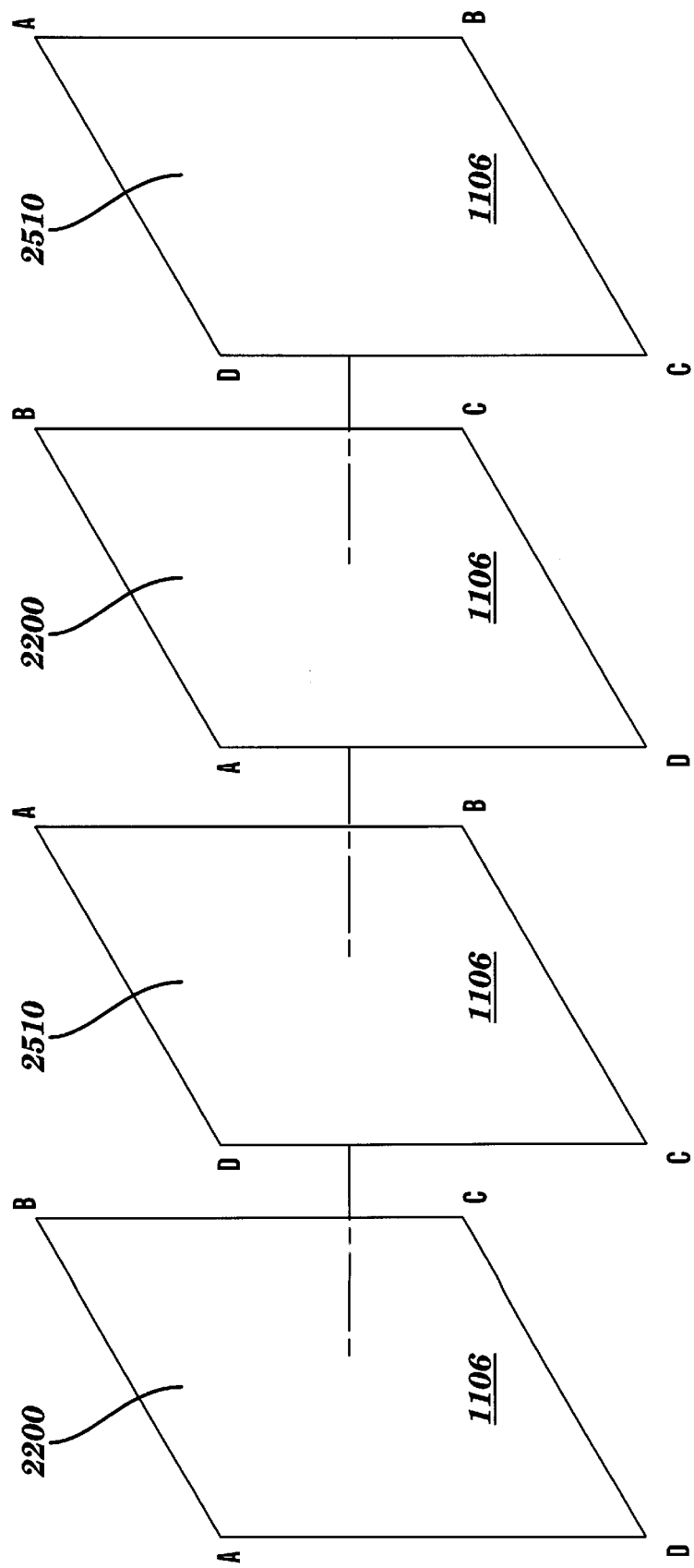
FIG. 13 is a perspective representation of multiple instances of the fluid flow plate of FIG. 12, illustrating an exemplary relative positioning of the fluid flow plates for providing an exemplary use of the manifolds and surfaces.

Referring now to FIG. 13, multiple instances of fluid flow plate 1100 are illustrated with reference labels A, B, C, and D indicating an exemplary relative orientation among the fluid flow plates. As can be understood through examination of FIGS. 11–12 in conjunction with FIG. 13, the multiple instances of apertures for entrance and exit of fluids are used at varying relative orientations among the multiple fluid flow plates.

For explanatory purposes, FIG. 13 depicts two distinct orientations for fluid flow plate 1100. Those skilled in the art will appreciate further orientation(s) and/or additional feature(s) for the fluid flow plates may be provided. A description of use and reuse of various apertures and manifolds on different faces of the multiple instances of the fluid flow plate 1100 is now presented.

In one example, referring to FIGS. 11–13, aperture 1114 on first instance 2200 of fluid flow plate 1100 forms a portion of fuel entrance manifold 1116, where port 1118 provides fluid communication between the entrance fuel manifold 1116 and flow channel area 1110. The aperture 1114 on the first instance 2200 of the fluid flow plate 1100 has a first longitudinal axis of fuel cell assembly 100 passing therethrough. Further, the port 1118 on the first instance 2200 of the fluid flow plate 1100 has a second axis of the fuel cell assembly passing therethrough. In accordance with the relative positioning among multiple instances 2200, 2510 of the fluid flow plates 1100 illustrated in FIG. 13, aperture 1102 of second instance 2510 of the fluid flow plate 1100 forms a portion of the entrance fuel manifold 1116 having the first longitudinal axis of the fuel cell assembly passing therethrough. For explanatory purposes, the entrance fuel manifold 1116 of the first instance 2200 of the fluid flow plate 1100, can be considered as comprising entrance fuel manifold 1104 of the second instance 2510 of the fluid flow plate 1100. Furthermore, the second instance 2510 of the fluid flow plate 1100 lacks a port between the entrance fuel manifold 1116 and flow area 1110 on the second instance 2510 of the fluid flow plate 1100 through which the second longitudinal axis otherwise might pass. The second instance 2510 of the fluid flow plate 1100 would receive fuel from port 1118 into flow channel area 1110 at a location having yet a third longitudinal axis of the fuel cell assembly passing therethrough. In this exemplary illustration, the port 1118 on the second instance 2510 of the fluid flow plate 1100 would occur at a location ninety degrees relatively, transversely, and rotationally offset from the port 1118 on the first instance 2200 of the fluid flow plate 1100, as will be appreciated by those skilled in the art.

Having followed the above description of use and reuse of features for multiple instances 2200, 2510 of fluid flow plate 1100 to provide fuel entrance to the flow field through relative positioning, one can understand, in FIGS. 11–13 as well as in further embodiment(s), how cooperative arrangement of additional feature(s) for various instance(s) of the fluid flow plate 1100 may be utilized.

In one aspect, design flexibility may be enhanced and/or structural choice(s) may be expanded in accordance with the principles of the present invention. For instance, by multiplying the number of reactant fluid manifolds and selectively providing ports between a certain fluid manifold and only a subset (e.g., alternate or staggered ones) of an entire set of fluid flow plates in fuel cell assembly 100, the certain fluid manifold need not be as large as it would need to be in order to service the entire set of fluid flow plates in the fuel cell assembly. So, a certain aperture through a particular fluid flow plate forming a portion of the certain fluid manifold may be made smaller. For example, such a decrease in space consumption may allow addition and/or rearrangement of further feature(s) for the fluid flow plate and/or fuel cell assembly. In another aspect, the decrease in space consumption may allow a local decrease in dimension for the fluid flow plate and/or the fuel cell assembly. Similar advantage(s) may result with analogous multiplication for any type of fluid manifold and/or apertures therefor, including, for example, entrance, exit, fuel, oxidant, and/or humidification fluid manifolds and/or apertures therefor.

As will be appreciated by those skilled in the art feature(s) characteristic(s) and/or advantage(s) of the fluid flow plates described herein in any exemplary embodiment, may be applied and/or extended to any embodiment in accordance with the principles of the present invention.

In accordance with the principles of the subject invention, flow channel(s) may be formed with variable cross section(s). Where a plurality of flow channels carry certain fluid on a given fluid flow face between entrance and exit fluid manifolds, each of the plurality of flow channels is preferably formed having substantially the same length. By designing the flow channels to have substantially identical length, one largely prevents variance in pressure drop among the flow channels, thereby promoting uniform and equal flow as well as superior overall performance. Further, any variance in cross-section along a given flow channel, is preferably substantially duplicated for companion flow channel(s) on the same fluid flow face which carry the same fluid for a same fuel cell.

A given fluid flow plate of the present invention which conducts fluids on both faces might be configured so the fluids have, for example, parallel flow, counter flow, and/or perpendicular flow among various (e.g., generally serpentine) flow channels. In particular, a parallel flow configuration might generally transversely align flow on the opposing faces by positioning corresponding first and second inlets at opposite sides of a first corner of the plate, and corresponding first and second outlets at opposite sides of a generally diametrically opposed second corner of the plate. Further, a counter flow design might provide flow in generally transversely opposite directions on the opposing faces by placing first inlet(s) and second outlet(s) at opposite sides of a first corner of the plate, and first outlet(s) and second inlet(s), respectively, at opposite sides of a generally diametrically opposed second corner of the plate. Moreover, perpendicular flow might entail flow channels on opposite sides of a plate oriented crosswise with respect to each other. Any variation(s), combination(s), and/or modification(s) of these concept(s) may be provided with any flow channel(s) and/or flow channel section(s).

Operation of a fuel cell assembly of the present invention can include periods or intervals of action and inaction, such as an active use followed by idling. Also, the fuel cell assembly can be employed for varied (e.g., automotive to aerospace to industrial to residential) applications, in various environments.

Numerous alternative embodiments of the present invention exist. Fluid flow plate 200 and/or fluid manifold(s) 150, 150' could serve any desired function with any appropriate orientation, shape, and/or formation in any position of fuel cell assembly 100. Further, fluid flow face 202 could easily have any number of flow channels 204. Any flow channel 204 could easily have any appropriate shape or structure. Also, flow channel(s) 204 could easily be configured to deviate, to any desired degree, from parallel alignment and/or serpentine design. Moreover, any of port(s) 206 and/or port(s) 208 might employ any mechanism for fluid communication between appropriate flow channel(s) 204 and fluid manifold(s) 150, 150'. Design choices permit variation in construction technique(s) and/or material(s) for any portion of fluid flow plate 200 and/or fuel cell assembly 100. Furthermore, fluid flow plate(s) 200 could easily be employed in any appropriate type(s) of fuel cell(s). Additionally, working section 114 could easily include any desired type(s) of fuel cell(s).

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A fuel cell plate, comprising:
    a first face, and a second face directed opposite to said first face;
    an inlet fluid manifold and an outlet fluid manifold, the inlet and outlet fluid manifolds each extending through the first and second faces of the plate;
    an inlet opening spaced from said inlet fluid manifold, and an outlet opening, spaced from said outlet fluid manifold, the inlet and outlet openings each extending through the first and second faces of the plate;
    an inlet channel on the first face of the plate extending from the inlet manifold to the inlet opening, and an outlet channel on the first face of the plate extending from the outlet manifold to the outlet opening;
    an active area channel on the second face of the plate extending from the inlet opening to the outlet opening; and
    a first formation on the second face opposite said inlet channel preventing fluid communication on said second face directly between the inlet fluid manifold and said active area channel, and a second formation on the second face opposite said outlet channel preventing fluid communication on said second face directly between said outlet manifold and said active area channel.

2. The fuel cell plate of claim 1, wherein said fluid comprises a reactant fluid.

3. The fuel cell plate of claim 1, wherein said fluid comprises humidification fluid.

4. The fuel cell plate of claim 1, wherein said active area channel comprises multiple active area channels, said inlet channel comprises multiple inlet channels, and said outlet channel comprises multiple outlet channels.

5. The fuel cell plate of claim 4, wherein said inlet opening comprises a single opening connecting said multiple inlet channels to said multiple active area channels, and said outlet opening comprises a single opening connecting said multiple active area channels to said multiple outlet channels.

6. The fuel cell plate of claim 1 wherein said active area channel comprises multiple active area channels, and at least one of said inlet opening and said outlet opening comprises multiple openings connected to said multiple active area channels.

7. The fuel cell plate of claim 6 wherein each of said multiple openings connects to a respective one of said multiple active area channels.

8. The fuel cell plate of claim 1 wherein said plate comprises a bipolar fluid flow plate.

9. The fuel cell plate of claim 1 wherein said plate comprises a monopolar fluid flow plate.

10. The fuel cell plate of claim 1 wherein said plate comprises a combined monopolar plate.

11. A fuel cell plate, comprising:
    a first face, and a second face directed opposite to said first face;
    a manifold aperture extending through the first and second faces of the plate;
    an opening spaced from said manifold aperture and extending through the first and second faces of the plate;
    a first face flow channel extending from said manifold aperture to said opening, and a second face flow channel extending from said opening; and
    a formation on the second face opposite said first face flow channel preventing fluid communication on said second face directly between said manifold aperture and said second face flow channel.

12. The fuel cell plate of claim 11 wherein said second face further includes a formation for preventing all fluid communication on said second face from said manifold aperture to said second face flow channel.

13. The fuel cell plate of claim 12 wherein said formation further serves at least one of a gasketing, sealing and clamping function with respect to a membrane electrode assembly adjacent said second face.

14. The fuel cell plate of claim 13 wherein said formation includes a peak for enhancing sealing with said membrane electrode assembly.

15. The fuel cell plate of claim 12 in combination with a gasket at least partially supported by said formation.

16. The fuel cell plate of claim 11 in combination with a second plate having a third face positioned adjacent said first face, said third face including a surface portion cooperating with said first face flow channel to define a passageway for fluid flow from said manifold aperture to said opening.

17. The fuel cell plate of claim 11 further including at least one rib in said first face flow channel for dividing said first face flow channel into multiple passages.

18. The fuel cell plate of claim 17 wherein said second face flow channel comprises multiple channels, and said opening comprises a single opening connecting said multiple passages to said multiple channels.

19. A method of preventing a perimeter seal of a fuel cell plate from sagging into a reactant flow channel of said plate, comprising:
    flowing a reactant from an inlet manifold to an inlet channel on a first side of a fuel cell plate;
    flowing the reactant through the inlet channel to an inlet opening which communicates the reactant to a second side of the plate;
    flowing the reactant through the inlet opening and across an active area channel on the second side of the plate, the active area channel communicating the reactant to an outlet opening, the outlet opening communicating the reactant to the first side of the plate;
    flowing the reactant through the outlet opening and across an outlet channel on the first side of the plate, the outlet channel communicating the reactant to an outlet manifold;
    preventing reactant flow on said second side directly between said inlet manifold and said active area channel with a first formation opposite the inlet channel, and preventing reactant flow on said second side directly between said active area channel, and said outlet manifold with a second formation opposite said outlet channel; and providing a perimeter seal around a periphery of the second side of the plate, the periphery including said first formation and the second formation, whereby said first formation prevents said perimeter seal from sagging into said inlet channel, and said second formation prevents said perimeter seal from sagging into said outlet channel.

* * * * *

UNITED STATES PATENT AND TRADEMARK OFFICE
CERTIFICATE OF CORRECTION

PATENT NO. : 6,174,616 B1  
DATED : January 16, 2001  
INVENTOR(S) : Marvin et al.

Page 1 of 1

It is certified that error appears in the above-identified patent and that said Letters Patent is hereby corrected as shown below:

Abstract,
Line 1, substitute -- A -- for "In one aspect, a", delete "("and")"
Line 2, delete "(s)"
Line 5, insert -- a -- between "providing" and "surface", delete "(s)"
Line 8, substitute -- impedes -- for "may impede"
Line 9, delete "plate" (first occurence)
Line 18, delete "(s)" (both instances)
Line 22, replace "may service" with -- provides --, replace "plate" with -- service --

Signed and Sealed this

Twenty-third Day of October, 2001

Attest:

*Nicholas P. Godici*

NICHOLAS P. GODICI  
*Attesting Officer*  *Acting Director of the United States Patent and Trademark Office*